United States Patent Office 3,507,800
Patented Apr. 21, 1970

3,507,800
FLAME RESISTANT PEROXIDES
Newton G. Leveskis, Richmond, Calif., assignor to U.S. Peroxygen Corporation, Richmond, Calif.
No Drawing. Continuation of application Ser. No. 266,185, Mar. 19, 1963. This application Oct. 5, 1966, Ser. No. 584,608
The portion of the term of the patent subsequent to May 3, 1982, has been disclaimed
Int. Cl. C01b *15/00*
U.S. Cl. 252—186                     5 Claims

ABSTRACT OF THE DISCLOSURE

Flame resistant organic peroxide compositions in which flame resistance is imparted through the incorporation of sufficient water, the water and the peroxide being formulated as a homogeneous non-separating mass with a mutual solvent or dispersant for the water and the organic peroxide.

---

This application is a continuation of Ser. No. 266,185, filed Mar. 19, 1963, now abandoned.

This invention relates to peroxide compositions. More particularly, it relates to organic peroxide compositions that are characterized by their flame resistance.

Peroxides have, as a general property, a tendency to be inflammable and explosive, with some exhibiting these properties to a greater extent than others. This property carries with it the obvious hazards to the users of these materials as well as to the manufacturers and intermediate handlers thereof. One particularly burdensome aspect of this property occurs during shipment of the peroxides, especially when the shipment is part of interstate commerce. In this latter case, peroxides have usually been found to fall within certain Interstate Commerce Commission regulations so as to be classified to require certain precautions in order to ship the materials.

The present invention is designed to provide compositions which avoid the hazards particularly in relation to the flammability of conventional peroxides. One attendant advantage obtained as a result, is the avoidance of coming within the classifications of the Interstate Commerce Commission relating to hazardous materials to thereby obviate the expensive and time-consuming precautions required by these regulations. In accordance with the present invention it has been discovered that if a certain group of organic peroxides (to be specified hereinafter) are placed in combination with at least about 18% water with respect to the total composition, and if a suitable mutual solvent capable of creating a homogeneous relationship between the peroxide and the water is present in the composition, a flame resistant material is obtained which, in most cases, is sufficiently flame resistant to avoid classification under the pertient ICC regulations. As a consequence, the organic peroxide compositions of the present invention are safer and easier to deal with by all concerned.

More particularly, the present invention provides a flame resistant peroxide composition consisting essentially of three components—water, peroxide, and solvent. The water is at least about 18% of the composition. The peroxide constituent is an organic peroxide selected from the group consisting of aliphatic hydrocarbon ketone peroxides, benzoyl peroxide, and chlorinated benzoyl peroxide. The aliphatic hydrocarbon ketone peroxide comprises about 15–30% of the composition, while the benzoyl peroxide or chlorinated benzoyl peroxide comprises about 15–50% of the composition. The mutual solvent for the water and organic peroxide for forming a homogeneous composition therewith depends upon the peroxide selected. The term "solvent" is herein used in a broad sense to include any substance that forms the requisite homogeneous condition whether it be by dispersion or true solution. For obvious reasons, the solvent selected should be inert with respect to the water and peroxide so as to leave the peroxide properties intact and equivalent to other peroxide compositions.

As noted, water is the common essential ingredient in the present compositions regardless of the other materials selected. The amount of water has a critical lower limit of about 18% with respect to the composition. In general, there is no upper limit to the amount of water which may be used. Rather, the upper limit will be governed by practical considerations of the consistency desired in the end product and the use to which the end product will be put. Obviously, in some end uses of the product, such as where the product is used as a polymerization initiator, the introduction of a large excess of water may not be desirable. Further, the use of more water requires more mutual solvent to create the homogeneous condition. Thus the water will generally be a minor part of the composition, i.e. less than 50%.

The present invention has been found to be feasible when utilizing one or more of a special group of organic peroxides which may be broken into two categories for purposes of discussion. On the one hand, aliphatic hydrocarbon ketone peroxides may be used in the present invention. This category of materials is aliphatic in nature as noted and contains only carbon and hydrogen except for the oxygen present in the peroxy group. Further, this category of materials comprises ketones. Preferred materials within this category include methyl alkyl ketone peroxides such as methyl ethyl ketone peroxide, acetone peroxide, methyl amyl ketone peroxide, methyl isobutyl ketone peroxide, and like ketone materials containing increasingly longer and/or branched alkyl chains in addition to the methyl group. Preferred materials also include cycloalkyl ketone peroxides such as cyclohexanone peroxide and cyclopentanone peroxide. As noted, this category of peroxides, i.e. aliphatic peroxides, comprises approximately 15–30% of the flame resistant composition.

The other category of peroxides contemplated for use in the present composition includes benzoyl peroxide and chlorinated benzoyl peroxides. The chlorinated peroxides may be either the monochlorinated species or any of the polychlorinated species such as 2,4-dichloro benzoyl peroxide. This category of peroxides is present in the composition again with a lower limit of about 15%. The upper limit is higher than in the case of the aliphatic peroxides noted above and may be as high as about 50%.

The balance of the essential ingredients in the present compositions is provided by the mutual solvent. Any mutual solvent that is capable of forming a homogeneous composition between the water and the organic peroxide and which does not react therewith to destroy the peroxide-water nature of the composition may be used. In the case of the aliphatic peroxides, the mutual solvent is preferably selected from liquid or water soluble aliphatic polyoxy alkanes and alkyl esters. The crucial aspect of these materials is the presence of the plurality of oxygen atoms advantageously selected from the polyalkylene glycols such as polyethylene glycol, polypropylene glycol, and other aliphatic polyhydroxy compounds which are liquid or soluble in water and which will dissolve both the peroxide and water or render them mutually miscible. Suitable polyoxy solvents further include water soluble polyethers, polyepoxies, polyaldehydes, and polyketones since they all contain the requisite oxygen and are aliphatic provided, of course, that they are a mutual solvent for the peroxide and water. The question of solubility, as will be obvious to those skilled in the art, can be readily determined by reference to appropriate solubility tables or by simple empirical tests.

As mentioned the mutual solvent for the aliphatic peroxide may be an ester in addition to the polyoxy alkanes exemplified above. Note that the ester group provides the requisite plural oxygen atoms. The ester group may also be in addition to the above types of polyoxy linkages. Thus, suitable solvents include esters such as ethylene glycol monoethyl ether acetate, diethylene glycol monoethyl ether acetate, methoxy triglycol acetate, propylene carbonate, trimethyl phosphate, silicate esters, and the like.

All of the above materials are basically hydrocarbons (or alkanes) except for the oxygen or, in the case of some of the esters, the atoms to which the oxygen is linked. Even in this latter case, the materials are generally alkyl esters. It has been found however, that some substituents may be present on the alkyl radicals, notably the halogens, without disturbing the inert relationship with the peroxides and water. For example, polyethylene glycol chloride is a suitable mutual solvent.

With respect to the aromatic peroxides, the mutual solvent need only be an inert solvent common to the water and peroxide and cause the end product to have a paste consistency. Generally, the mutual solvent for the aromatic materials is chosen from colloidal gel forming materials such as precipitated, finely divided silica, alkyl cellulose such as methyl cellulose, polyvinyl alcohol, pectin, egg albumen, water soluble resins such as the carboxy vinyl polymers, and like materials which will form gels in combination with the water of the present compositions.

The mutual solvent for the aromatic peroxide may also be selected from materials which form gels and belong to the broad class of materials known as detergents. As used herein, the term "detergent" is meant to include synthetic surfactants such as the nonionics like the polyglycol ethers of such materials as nonyl phenol, dodecyl phenol, trimethyl nonanol, as well as other alkyl phenol ethers of polyethylene glycol, polyalkylene glycol ethers in general, and the like. The term also includes the ionic detergents such as sodium heptadecyl sulfate, sodium di(2-ethyl hexyl) phosphate, sodium tetradecyl sulfate, sodium di(2-ethyl hexyl) sulfate, and the like. Equivalent for forming mutual solvent gels are those materials commonly referred to as soaps which are the salts of long chain fatty acids like the zinc, magnesium, aluminum, or sodium salts of stearic acid, lauric acid, and similar acids.

Alternatively, the mutual solvent for the aromatic peroxide may be a plasticizer as that term is commonly understood in the polymer art. Thus, suitable plasticizers include the alkyl phthalates, butyl benzoate, di-butyl fumarate, di-octyl adipate, tricresyl phosphate, as well as any of the various polyesters conventionally used for such purposes.

In the case of the aliphatic peroxides a portion of the mutual solvent may, if desired, include a plasticizer such as those utilized with the aromatic peroxides. If this alternative is desired, a suitable product is obtained wherein the plasticizer comprises generally up to about 20% of the total solvent, although departures from this figure may be possible with some materials. It should also be pointed out that with either category of peroxide, the mutual solvent for use therewith may be combinations of the materials listed as suitable solvents for the particular category of peroxide being used.

In some cases, especially with respect to the aliphatic peroxides, it may be desirable to include hydrogen peroxide in the composition. Where hydrogen peroxide is included, generally it may comprise up to about 10% of the total composition. The amount of hydrogen peroxide to be included is generally dictated by the type of resin that the peroxide composition will be used with in the cases where the composition is used as a polymerization initiator.

The invention is illustrated by the following specific examples:

EXAMPLE 1

The following materials were used:

| | Grams |
|---|---|
| Methyl ethyl ketone peroxide | 2.6 |
| Di-methyl phthalate | 1.8 |
| Polypropylene glycol (molecular weight 150) | 3.6 |
| Distilled water | 2.0 |

The above materials were mixed together until a homogeneous clear transparent water-white liquid was obtained.

A sample of the above withstands incubation at 45° C. for 48 hours. Its flash point is about 100° F. The sample cannot readily be ignited by a match flame although it can be ignited and caused to burn with a match flame and a paper wick. When so ignited, it burns slowly and reasonably steady without much acceleration.

The above material has been found by the Bureau of Explosives not classifiable under ICC regulations.

EXAMPLE 2

The composition of Example 1 is modified by substituting cyclohexanone peroxide for the methyl ethyl ketone peroxide and substantially equivalent results are obtained.

EXAMPLE 3

Example 1 is modified by substituting methyl isobutyl ketone peroxide and substantially equivalent results are obtained.

EXAMPLE 4

Example 1 is modified by adding .5 gram of distilled water thereto and substantially equivalent results are obtained.

EXAMPLE 5

Example 1 is modified by substituting ethylene glycol monoethyl ether acetate (Cellosolve acetate) for the polypropylene glycol and substantially equivalent results are obtained.

EXAMPLE 6

Example 1 is modified by substituting propylene carbonate for the polypropylene glycol and substantially equivalent results are obtained.

EXAMPLE 7

Example 1 is modified by substituting polyethylene glycol chloride (M. W. 410) for the polypropylene glycol and substantially equivalent results are obtained.

EXAMPLE 8

A combination of methyl ethyl ketone peroxide in dimethyl phthalate comprising 60% peroxide was used. 13 parts of polypropylene glycol (molecular weight 150) was added to each 100 parts of the above. The product was vacuumed until the active oxygen was 10.5%. The material was then further vacuumed until the active oxygen was estimated at 11.0%. To 4.4 parts of the material, 3.0 parts of polypropylene glycol (molecular weight 150) and 2.7 parts of water were added and the components blended. 11 parts of 50% hydrogen peroxide in water was added per 100 parts and uniformly dispersed. The product was a clear transparent water-white liquid.

The above materials cannot be ignited readily by a match flame. When a wick is inserted and ignited the sample burns slowly for a short time without noticeable acceleration.

A portion of the materials was used to saturate dry absorbent cotton and this combination was subjected to initiation by a #8 blasting cap. The material did not explode.

The above material was found not subject to classification under ICC regulations by the Bureau of Explosives.

EXAMPLE 9

A flame resistant peroxide composition was prepared from the following materials:

|  | Parts |
|---|---|
| Benzoyl peroxide | 32 |
| Water | 13 |
| Polyalkylene glycol ether XD [1] | 4 |

[1] This is a Tergitol nonionic detergent made by Union Carbide Chemical Company.

The above materials were mixed until a smooth paste, formed. Then one part of zinc stearate was mixed in thoroughly.

The material withstood 24 hours at 50° C. and freezing in Dry Ice without adverse effect.

The final composition has a paste consistency with the characteristics of a lubricating grease. It is practically noncombustible in that it resists ignition by a match flame. Even persistent contact with a gas burner flame merely causes the composition to burn quietly in spurts and does not continue to burn when the flame source is removed. In general, when exposed to heat, the mass softens and particlly liquifies but there is no indication of vigorous decomposition.

Although this is a benzoyl peroxide formulation, the materials has been found to be not within the classification under ICC regulations by the Bureau of Explosives.

EXAMPLE 10

Where 2,4-dichloro benzoyl peroxide is substituted for the benzoyl peroxide of Example 9, substantially equivalent results are obtained.

EXAMPLE 11

Where colloidal silica is substituted for all of the detergent of Example 9, substantially equivalent results are obtained.

EXAMPLE 12

Where more plasticizer (butyl benzyl phthalate) is substituted for all of the detergent of Example 9, substantially equivalent results are obtained.

All percentages and parts recited herein are by weight.

What is claimed is:

1. A flame resistant peroxide composition consisting essentially of: at least the minimum amount of water necessary to create flame resistance; a saturated hydrocarbon ketone peroxide, the monomeric form of its molecule having up to about 7 carbon atoms; and sufficient water soluble polyalkylene glycol to form a homogeneous condition between said peroxide and water.

2. A composition in accordance with claim 1 wherein the minimum amount of water in said composition is at least about 18% and said organic peroxide is methyl ethyl ketone peroxide.

3. A flame resistant peroxide composition consisting essentially of: at least the minimum amount of water necessary to create flame resistance; an organic peroxide selected from the group consisting of benzoyl peroxide and 2,4-dichlorobenzoyl peroxide; and sufficient colloidal silica to form a homogeneous condition between said water and organic peroxide.

4. A composition in accordance with claim 3 wherein the minimum amount of water in said composition is at least 18%, and said peroxide is present in the composition to constitute about 15–50% thereof.

5. A flame resistant peroxide composition consisting essentially of: at least the minimum amount of water necessary to create flame resistance; benzoyl peroxide; and sufficient polyalkylene glycol ether to form a non-separating homogeneous paste having the consistency of lubricating grease, said polyalkylene glycol ether being a white soft-solid at 20° C. having a cloud point in .5% aqueous solution of about 72–77° C., a pH of 6.0 in .1% aqueous solution, a freezing point of about 28–38° C., and a specific gravity at 40/20° C. of about 1.053.

References Cited

UNITED STATES PATENTS

| 2,838,472 | 6/1958 | Lucas | 252—186 XR |
| 2,886,532 | 5/1959 | Richmond | 252—186 |
| 2,927,084 | 3/1960 | Olcott | 252—186 XR |
| 3,029,206 | 4/1962 | Harrison | 252—186 XR |
| 3,061,554 | 10/1962 | Vartanian et al. | 252—426 XR |
| 3,077,412 | 2/1963 | Hegashwichi | 260—610 XR |
| 3,182,026 | 5/1965 | Leveskis | 252—430 |

FOREIGN PATENTS

| 827,511 | 2/1960 | Great Britain. |

MAYER WEINBLATT, Primary Examiner

U.S. Cl. X.R.

256—8.1; 260—610

UNITED STATES PATENT OFFICE
CERTIFICATE OF CORRECTION

Patent No. 3,507,800    Dated April 21, 1970

Inventor(s) Newton G. Leveskis

It is certified that error appears in the above-identified patent and that said Letters Patent are hereby corrected as shown below:

In the heading to the printed specification, line 6, "U. S. Peroxygen Corporation, Richmond, Calif." should read -- Argus Chemical Corporation, a corporation of Delaware --.

Signed and sealed this 1st day of September 1970.

(SEAL)
Attest:

EDWARD M. FLETCHER, JR.
Attesting Officer

WILLIAM E. SCHUYLER, JR.
Commissioner of Patents